United States Patent
Qi et al.

(10) Patent No.: US 12,335,029 B1
(45) Date of Patent: Jun. 17, 2025

(54) COHERENT LIGHT RECEIVING OPTICAL DEVICE

(71) Applicant: SiFotonics Technologies (Beijing) Co., Ltd., Beijing (CN)

(72) Inventors: Fan Qi, Beijing (CN); Chang Liu, Beijing (CN); Zhou Fang, Beijing (CN); Pengfei Cai, Beijing (CN)

(73) Assignee: SiFotonics Technologies (Beijing) Co., Ltd., Beijing (CN)

( * ) Notice: Subject to any disclaimer, the term of this patent is extended or adjusted under 35 U.S.C. 154(b) by 0 days.

(21) Appl. No.: 18/794,785

(22) Filed: Aug. 5, 2024

(30) Foreign Application Priority Data

Mar. 5, 2024 (CN) .......................... 202410247498.5

(51) Int. Cl.
*H04B 10/60* (2013.01)
*H04B 10/61* (2013.01)
*H04J 14/02* (2006.01)

(52) U.S. Cl.
CPC ........ *H04J 14/0212* (2013.01); *H04B 10/614* (2013.01)

(58) Field of Classification Search
CPC .......................... H04J 14/0212; H04B 10/614
See application file for complete search history.

(56) References Cited

U.S. PATENT DOCUMENTS

| 3,883,220 A * | 5/1975 | Taylor ................... G02F 1/3137 385/16 |
| 6,614,955 B1 * | 9/2003 | Sorin ........................ G01J 9/00 385/16 |
| 6,868,201 B1 * | 3/2005 | Johnson .............. H04J 14/0209 385/24 |
| 7,596,323 B1 * | 9/2009 | Price ................... H04L 27/2096 398/208 |
| 10,763,968 B1 * | 9/2020 | Li ........................... H04B 10/40 |
| 10,979,148 B1 * | 4/2021 | Zhou ...................... H04B 10/63 |
| 11,342,997 B1 * | 5/2022 | Haylock ................ H04B 10/40 |
| 2010/0178056 A1 | 7/2010 | Liu |
| 2012/0301142 A1 * | 11/2012 | Huang .................. H04J 14/002 398/48 |

(Continued)

FOREIGN PATENT DOCUMENTS

| CN | 111525962 A | 8/2020 |
| CN | 111628827 A | 9/2020 |

(Continued)

*Primary Examiner* — Tanya T Motsinger

(57) ABSTRACT

The present disclosure provides a coherent light receiving optical device. It includes: an optical switch group, each optical switch thereof is configured to switch between two different preset bands and output two signal lights or two oscillation lights corresponding to the two different preset bands; a 1×2 power beam splitter group, each 1×2 power beam splitter thereof is configured to split one of the two oscillation lights into two split oscillation lights; an optical hybrid group, each optical hybrid thereof is configured to mix the one split oscillation light from an oscillation path with one signal light from a signal path in the same preset band, to output a mixed light; a detector group, each detector thereof is configured to convert the mixed lights of two different preset bands in the mixed lights into photocurrent in the same detector, so as to multiplex the detector.

9 Claims, 11 Drawing Sheets

(56) References Cited

U.S. PATENT DOCUMENTS

| | | | |
|---|---|---|---|
| 2013/0058650 A1* | 3/2013 | Bouda | H04J 14/0212 |
| | | | 398/152 |
| 2014/0341564 A1* | 11/2014 | Westlund | H04B 10/0731 |
| | | | 398/16 |
| 2016/0241352 A1* | 8/2016 | Matsuda | H04B 10/5561 |
| 2018/0023948 A1* | 1/2018 | Bennett | G01K 11/32 |
| | | | 356/601 |
| 2018/0100967 A1* | 4/2018 | Parker | G02B 6/12004 |
| 2018/0146270 A1* | 5/2018 | Jiang | H04Q 11/0066 |
| 2021/0367679 A1* | 11/2021 | Zhao | H04B 10/614 |
| 2022/0029709 A1* | 1/2022 | Freeman | H04B 10/6164 |
| 2023/0319447 A1* | 10/2023 | Minoofar | H04Q 11/0005 |
| | | | 398/58 |

FOREIGN PATENT DOCUMENTS

| | | |
|---|---|---|
| CN | 114706059 A | 7/2022 |
| CN | 117318829 A | 12/2023 |

\* cited by examiner

COHERENT LIGHT RECEIVING OPTICAL DEVICE

CROSS-REFERENCE TO RELATED APPLICATION

This application claims priority to Chinese Patent Application No. 202410247498.5, entitled "Coherent light receiving optical device" and filed on Mar. 5, 2024, in the National Intellectual Property Administration of China, the whole disclosure of which is incorporated herein by reference.

TECHNICAL FIELD

The present invention relates to the field of coherent light communication technology, and in particular to a coherent light receiving optical device.

BRIEF DESCRIPTION OF THE RELATED ART

Wavelength division multiplexing is currently the most common long-distance optical communication technology, which multiplexes signal lights of different wavelengths into one optical fiber, thereby easily achieving optical transmission of several Tbit/s to hundreds of Tbit/s with a single optical fiber. Under the condition that the data rate carried by a single wavelength is constant, the more channels are multiplexed, the higher transmission rate of the single optical fiber is.

Therefore, the common core network communication needs to multiplex 96 or even more wavelengths into the one optical fiber. In the era of single wavelength of 100 G, the spectrum occupied by each wavelength channel has a relatively small range, thus the total wavelength range having the 96 channels is also narrow, the total spectrum width is in the range of 40-50 nm. The commonly designed optical devices can typically operate in this range.

Developing into the era of 400 G for the single wavelength, since the spectrum range occupied by each channel becomes wider, the spectrum range occupied by the 96 channels is required around 100 nm, which requires specially designed optical devices to operate within this range. Some of the specially designed optical devices require process control of extremely high precision, which will lead to unacceptable cost. Some of them require to intercept signal from high speed signal ends and preform real-time feedback control. It seems like this kind of design is complex from a system perspective and may also affect the high speed signals at the same time. Further, an even wider spectrum range is required as developing into the era of 800 G for the single wavelength.

SUMMARY OF THE DISCLOSURE

In order to at least partially solve technical problems as described above, an aim of the present invention is intended to provide a new coherent light receiving optical device.

In a first aspect of the present invention, a coherent light receiving optical device is provided, wherein the coherent light receiving optical device includes:

an optical switch group, each optical switch of the optical switch group is configured to switch between two different preset bands and output two signal lights or two oscillation lights corresponding to the two different preset bands;

a 1×2 power beam splitter group, each 1×2 power beam splitter of the 1×2 power beam splitter group is configured to split one of the two oscillation lights into two split oscillation lights;

an optical hybrid group, each optical hybrid of the optical hybrid group is configured to mix the one splitting oscillation light from an oscillation path with one signal light from a signal path in the same preset band, to output a mixed light;

a detector group, each detector of the detector group is configured to convert the mixed lights of two different preset bands in the mixed lights into a photocurrent in the same detector, so as to multiplex the detector.

Further, a second aspect of the present invention also provides a method of coherent light receiving, the method of coherent light receiving includes following steps:

by an optical switch group switching a signal light or an oscillation light between different light paths and outputting two different signal lights or oscillation lights of a preset band;

by a 1×2 power beam splitter group splitting one of the two oscillation lights into two split oscillation lights;

by an optical hybrid group mixing one split oscillation light from an oscillation path with a signal light from a signal path in the same preset band and outputting it as a mixed light;

multiplexing a detector group to convert the mixed lights of two different preset bands of the mixed lights into photocurrents in the same detector.

In some embodiments of the second aspect, the two different preset bands are referred to two continuous or discontinuous bands of a spectrum, or two continuous or discontinuous band segments in the same band of the spectrum, and the coherent light receiving optical device multiplexes the detector group in both of the two different preset bands.

In some embodiments of the second aspect, the optical switch group is provided with three optical switches which are a first optical switch, a second optical switch and a third optical switch, wherein the signal lights are respectively outputted as a first band signal light or a second band signal light in the signal path after passing through the first optical switch and the second optical switch; and the oscillation light is outputted as a first band oscillation light or a second band oscillation light in the oscillation path after passing through the third optical switch.

The first band and the second band of the first band signal light and the second band signal light refer to the two different preset bands as described above, and the first band and the second band of the first band oscillation light and the second band oscillation light, refer to the two different preset bands as described above; and the first band of the first band signal light and the first band of the first oscillation light are referred to the same band, the second band of the second band signal light and the second band of the second band oscillation light are referred to the same band.

In some embodiments of the second aspect, the first band oscillation light or the second band oscillation light is split into two first band split oscillation lights or two second band split oscillation lights respectively by two 1×2 power beam splitters of the 1×2 power beam splitter group;

an optical hybrid group is provided as two kinds of optical hybrids corresponding to the two different preset bands, i.e. two first band optical hybrids and two second band optical hybrids; each of the two first band optical hybrids is configured to mix one of the two first band split oscillation lights from the oscillation path with one of the first band signal lights from the signal path and then output a first band mixed light, and each of the two second band optical hybrids is configured to mix one of the two second band split oscillation lights from the oscillation path with one of the second band signal lights from the signal path and then output a second band mixed light;

the first band mixed light and the second band mixed light are converted into photocurrent in the same detector at two input ports of each detector so as to multiplex the detector.

In some embodiments of the second aspect, a polarization rotation beam splitter is disposed upstream of the optical switch in the signal path of the coherent light receiving optical device; the polarization rotation beam splitter is configured to split one signal light into a first polarization rotation signal light and a second polarization rotation signal light and they enter the optical switch.

Alternatively, a polarization rotation beam splitter or a combination of a polarization beam splitter and a polarization rotator is disposed outside the coherent light receiving optical device, and is configured to split one signal light into a first polarization rotation signal light and a second polarization rotation signal light and they enter the coherent light receiving optical device.

In some embodiments of the second aspect, at least one adjustable optical attenuator is arranged in a light path containing each optical switch and located behind each optical switch.

Alternatively, at least one adjustable optical attenuator may also be disposed outside the coherent light receiving optical device, wherein the signal light or oscillation light passes through the externally disposed at least one adjustable optical attenuator and enters the coherent light receiving optical device.

In some embodiments of the second aspect, at least one light splitter is disposed adjacent to the at least one adjustable optical attenuator in the corresponding light path and located upstream or downstream of the at least one adjustable optical attenuator.

In some embodiments of the second aspect, at least one power monitoring detector is disposed downstream of each light splitter in the light path, and a portion of the light split by the corresponding light splitter enters one of the at least one power monitoring detector or into at least two of the at least one power monitoring detector which are connected in series.

In some embodiments of the second aspect, one heating resistor is disposed near each detector.

In some embodiments of the second aspect, at least one coupler is disposed, wherein the signal light or oscillation light enters the signal path or oscillation path after passing through the at least one coupler.

In some embodiments of the second aspect, at least one a 2×2 power beam splitter is arranged correspondingly behind the optical hybrid group and have two input ends connected to the same detector.

The coherent light receiving optical device in accordance with the embodiments of the present invention has at least one of the following advantages:

Various embodiments of the present invention provide the coherent light receiving optical device or the coherent light receiving chip for multi-bands, wherein the broad-spectrum optoelectronic devices are multiplexed for the different working bands; for the devices that cannot work in the broad spectrum, the independent devices are disposed for each band, and all devices are integrated in the single chip to achieve the function of covering bands on the single chip. Furthermore, by multiplexing a portion of high speed optoelectronic devices, the demand for the high speed optoelectronic chips to be used is reduced, thereby reducing the final cost of use.

BRIEF DESCRIPTION OF THE DRAWINGS

These and/or other aspects and advantages of the present invention will become apparent and easy to understand from following description of preferred embodiments in conjunction with the drawings.

DETAILED DESCRIPTION OF EXEMPLARY EMBODIMENTS

Figure 1:
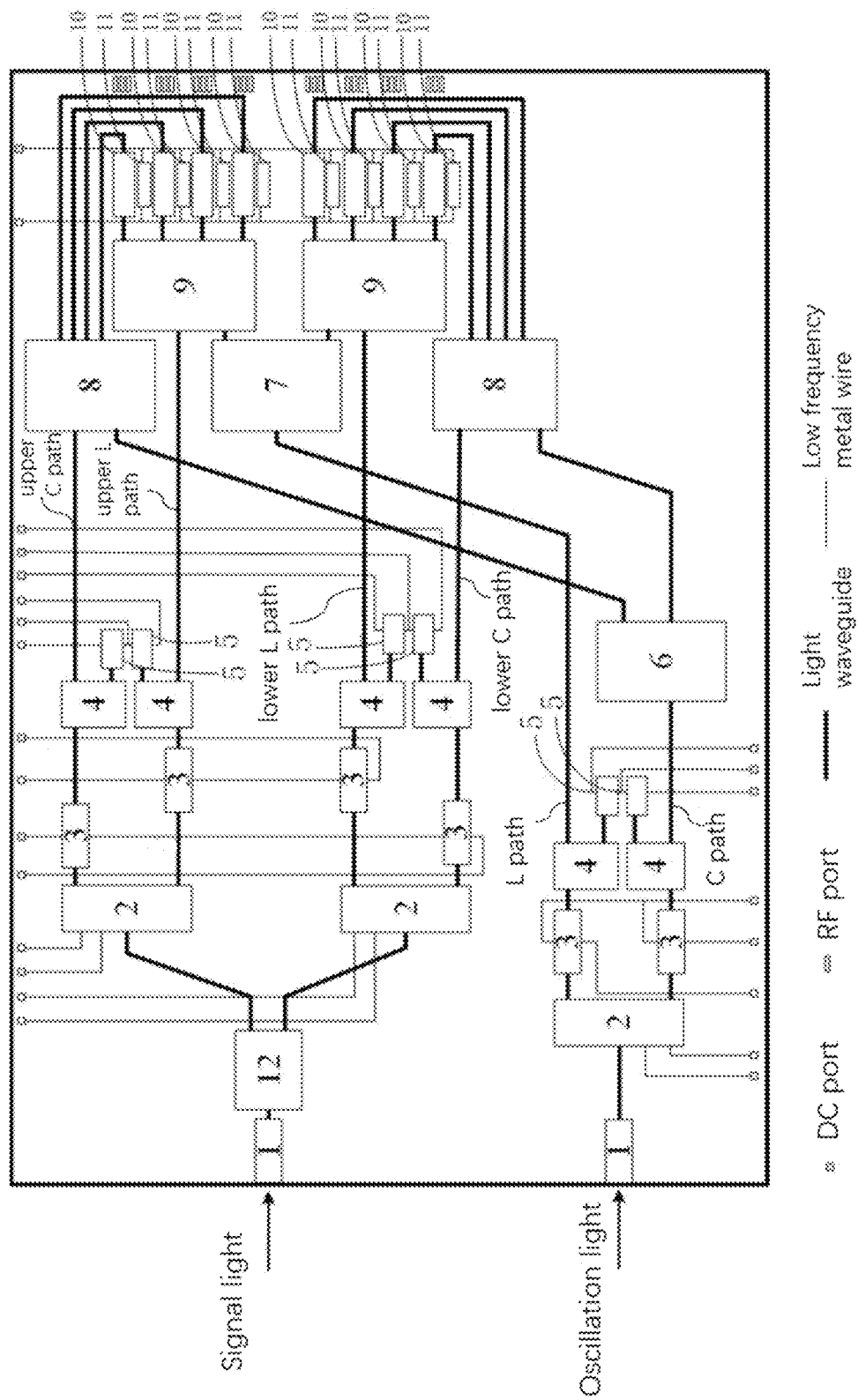
FIG. 1 shows a schematically structural view of a coherent light receiving optical device according to an embodiment of the present invention.

The technical solution of the present invention will be further specifically explained below by embodiments and in conjunction with the accompany drawings. In the specification, the same or similar reference numbers indicate the same or similar components. The description of the embodiments of the present disclosure with reference to the drawing intends to explain the general inventive concept of the present invention and should not be understood as a limitation to the present disclosure.

According to the general inventive concept of the embodiments of the present invention, a coherent light receiving optical device and a coherent light receiving method are provided.

Specifically, an embodiment of the present invention provides a coherent light receiving optical device. The coherent light receiving optical device includes:

an optical switch group, each optical switch of the optical switch group is configured to switch between two different preset bands and output two signal lights or two oscillation lights corresponding to the two different preset bands;

a 1×2 power beam splitter group, each 1×2 power beam splitter of the 1×2 power beam splitter group is configured to split one of the two oscillation lights into two split oscillation lights;

an optical hybrid group, each optical hybrid of the optical hybrid group is configured to mix one split oscillation light from an oscillation path with one signal light from a signal path in the same preset band, and output a mixed light; and a detector group, each detector of the detector group is configured to convert the mixed lights of two different preset bands in the mixed lights into photocurrent in the same detector, so as to multiplex the detector.

Further, another embodiment of the present invention provides a coherent light receiving method, wherein the coherent light receiving method includes the following steps:

switching a signal light or an oscillation light between different light paths and outputting two signal lights or oscillation lights corresponding to two different preset bands by an optical switch group;

splitting one of the two oscillation lights into two split oscillation lights by a 1×2 power beam splitter group;

mixing one split oscillation light from an oscillation path with a signal light from a signal path in the same preset band and outputting it as a mixed light by an optical hybrid group;

converting the mixed lights of two different preset bands in the mixed lights into photocurrent by a detector group.

Below, the specific structural settings of the coherent light receiving optical device and the specific implementation steps of the coherent light receiving method provided by the present invention will be described in detail with reference to the drawings and different embodiments.

Please refer to FIG. 1, and it shows a schematically structural view of a coherent light receiving optical device according to an embodiment of the present invention. In an embodiment, the coherent light receiving optical device may be set as a silicon photonic chip or other similar forms, with all optical devices included therein being silicon photonic devices. The description is done by taking the coherent optical receiving optical device to operate in two different bands C and L (i.e., a C band and a L band) as an example.

As shown in FIG. 1, the silicon photonic chip includes broad spectrum devices: a coupler 1, an optical switch group, a polarization rotation beam splitter 12, at least one adjustable optical attenuator 3, at least one light splitter 4, at least one power monitoring detector 5, a high speed detector group and at least one heating resistor 11. As shown, the optical switch group includes three optical switches 2; the at least one adjustable optical attenuator 3 includes six adjustable optical attenuators; the at least one light splitter 4 includes six light splitters; the at least one power monitoring detector 5 includes six power monitoring detectors; the high speed detector group includes eight high speed detectors 10; and the at least one heating resistor 11 includes eight heating resistors.

Meanwhile, the silicon photonic chip also includes narrow-spectrum devices: a 1×2 power beam splitter group and a 90° optical hybrid group. As shown, the 1×2 power beam splitter group includes two 1×2 power beam splitters 6 and 7; the 90° optical hybrid group includes two first 90° optical hybrids 8 and two second 90° optical hybrids 9. It is understood that the 90° optical hybrid herein can be disposed to be other type optical hybrids.

The operating bands of the broad-spectrum devices aforementioned are the C and L bands. The operating band of the 1×2 power beam splitter 6 and two first 90° optical hybrids 8 is the C band; and the operating band of the other 1×2 power beam splitter 7 and two second 90° optical hybrids 9 is the L band. By taking the operating band being the C band as one example, (1) a signal light from a signal path (shown at the left side of FIG. 1) passes through an edge coupler 1 and enters the silicon photonic chip, and then after passing through the polarization rotation beam splitter 12 is split into two polarization rotation signal lights (i.e. a first polarization rotation signal light and a second polarization rotation signal light), which respectively enter a corresponding optical switch. By taking one path thereof as an example (i.e., an upper C path shown in FIG. 1), after passing the optical switch 2, the polarization rotation signal light is outputted as a C band signal light (i.e. the first band signal light) from the C path, and then enters a C band 90° optical hybrid (i.e. the first band optical hybrid) 8 after passing through the adjustable optical attenuator 3 and the light splitter 4; after the C band signal light in the first band optical hybrid 8 is mixed with the C band split oscillation light (i.e. the first band split oscillation light) from the oscillation path, they then enter the high speed detectors 10 of the high speed detector group respectively.

Meanwhile, a small proportion of the signal light which is split by the light splitter 4 in the C path enters the power monitoring detector 5. It should be explained that the proportion of the signal light which is split by the light splitter 4 can be set as required, without any limitation to it in the present invention. In present embodiment, a small portion of the signal light is coupled to the power monitoring detector 5 by the light splitter (a tap) 4; and when the input of the optical switch 2 is used for different channels, an output current of the power monitoring detector 5 is used as a feedback signal, to control an operating point of the optical switch 2.

Moreover, in this way, the optical split operation by the light splitter 4, will not cause distortion or significant attenuation of signal; however, it is easy to cause distortion or attenuation of signal when detecting high speed RF signal is performed after a high speed trans-impedance amplifier (TIA) chip; at the same time, the use of a high speed RF device (i.e., the peak detector) is eliminated.

The other path working on the C band (i.e., the other lower C path shown in FIG. 1) transmits in the same way as the upper C path, and the specific details thereof are not repeated herein.

(2) After passing through the edge coupler 1, the oscillation light (shown at the lower part of FIG. 1) enters the silicon photonic chip, and then an optical switch 2. The oscillation light outputs a C band oscillation light (i.e. the first band oscillation light) from the C path after passing through the optical switch 2. The C band oscillation light passes through the adjustable optical attenuator 3, the light splitter 4 and the C band 1×2 power beam splitter 6 disposed on the C path, and is split into two C band split oscillation lights (i.e. the first band split oscillation lights). The two C band split oscillation lights respectively enter the two C band 90° optical hybrids (i.e. the first band optical hybrids) 8. In the two 90° optical hybrids 8, the two C band split oscillation lights are respectively mixed with the C band signal lights from the signal path and output as C band mixed lights (i.e., the first band mixed lights). The C band mixed lights enter the high speed detectors 10 of the high speed detector group respectively. Similarly, the power monitoring detector 5 is disposed behind the light splitter 4, and the specific details thereof are not repeated herein.

Below, taking working on the L band as an example, (3) after passing through the edge coupler 1, the signal light (shown at the left side of FIG. 1) enters the silicon photonic chip via the signal path, and is split into the two polarization rotation signal lights (i.e. the first polarization rotation signal light and the second polarization rotation signal light) after passing through the polarization rotation beam splitter 12. The two polarization rotation signal lights respectively enter the corresponding one of the optical switches. Taking one path thereof as an example (a L path in FIG. 1), after passing the optical switch 2, the polarization rotation signal light is outputted as the L band signal light (i.e. the second band signal light) in the L path, then the L band signal light enters the L band 90° optical hybrid (i.e. the second band optical hybrid) 9 after passing through the adjustable optical attenuator 3 and the light splitter 4. In the second 90° optical hybrid 9, the L band signal light is mixed with a L band split oscillation light (i.e. the second band split oscillation light) from the oscillation path and is outputted as L band mixed lights (i.e. a second band mixed light), then the L band mixed lights enter the high speed detectors 10 of the high speed detector group respectively.

Meanwhile, a small proportion of the signal light which is split by the light splitter 4 enters the power monitoring detector 5. The other path working on the L band (i.e., the other L path in FIG. 1) is outputted in the same way as the upper L path, specific details thereof are not repeated herein.

(4) After passing through the edge coupler 1, the oscillation light (shown in the lower part of FIG. 1) enters the silicon photonic chip, and then enters into the optical switch 2. The oscillation light is outputted as a L band oscillation light (i.e. the second band oscillation light) in the L path. After passing through the adjustable optical attenuator 3, the light splitter 4 and the L band 1×2 power beam splitter 7 disposed on the L path, the L band oscillation light is split into the two L band split oscillation lights (i.e. the two second band split oscillation lights). The two L band split oscillation lights respectively enter the two L band 90° optical hybrids (i.e. the second band optical hybrids) 9. In the two second 90° optical hybrids 9, the two L band split oscillation lights are respectively mixed with the L band signal lights (the second band signal lights) from the corresponding signal paths and outputted as the L band mixed lights (the second band mixed lights), and then the L band mixed lights enter the high speed detectors 10 of the high speed detector group respectively.

It can be seen from the above description that the operation of the silicon photonic chip in the L band is similar to that in the C band, with the only difference being that the optical switch 2 outputs lights from the L path, and then the way of transmitting light in the L path is similar to that in the C path.

In a practical example, the C band ranges from 1524 nm to 1572 nm, and the L band ranges from 1572 nm to 1626 nm. Those skilled in the art will appreciate that the bands are not limited to the two bands as described above; the specific wavelength values of the upper and lower limits of the bands are also not limited to these four wavelength values.

Alternatively, the two operating bands described herein can also be two continuous bands or two discontinuous bands of the spectrum, for example, one band ranges from 1280 nm to 1340 nm, and the other band ranges from 1520 to 1580 nm; for example, one band ranges from 1520 nm to 1550 nm, and the other band ranges from 1550 nm to 1580 nm.

In an embodiment, alternatively, the 1×2 power beam splitters 6 and 7 may also be set as to be the same type of devices, i.e., both of 1×2 power beam splitters 6 and 7 are arranged as the same broad-spectrum 1×2 power beam splitters that can operate in both the C band and the L band.

Figure 2A:
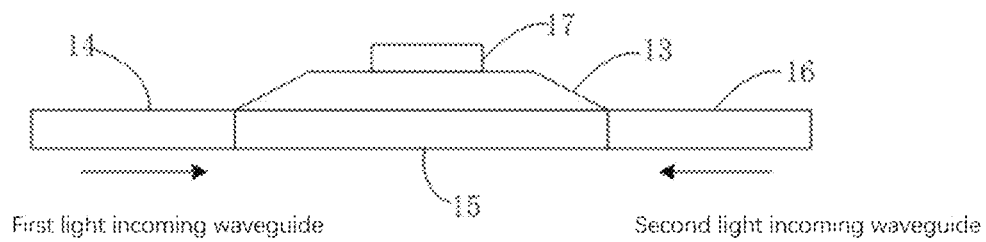
FIG. 2A and FIG. 2B show respectively a side view and a top view of structure of a high speed detector according to one embodiment of the present invention.
Figure 2B:
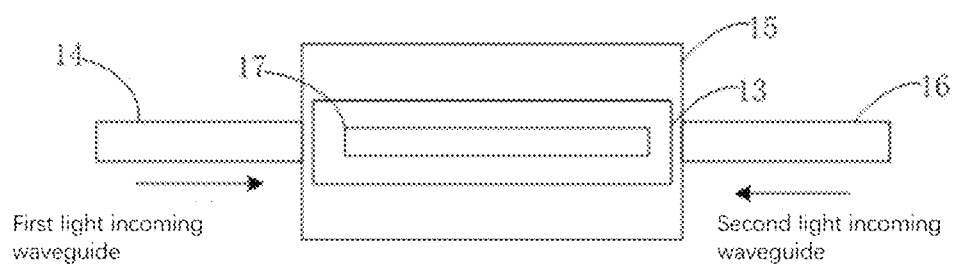

Please refer to FIG. 2A and FIG. 2B, which show respectively a side view and a top view of a structure of a high speed detector 10 according to an embodiment of the present invention.

In the present embodiment, each high speed detector 10 has two input ports. The high speed detector is implemented by using a Ge-on-Si based process. The high speed detector 10 includes a Ge absorption region 13, a silicon substrate, a bottom electrode 15, a metal top electrode 17, a first light incoming port (or first light incoming waveguide) 14, and a second light incoming port (or second light incoming waveguide) 16.

For the high speed detector 10, one heating resistor 11 is disposed in a region near it or around it. When operating in the band of 1572-1626 nm, the heating resistor 11 needs to be turned on to maintain the temperature of the high speed detector (or PD) 10 above some specific temperature T. The temperature T can be 20° C., 30° C., 40° C., 50° C., 60° C., 70° C., 80° C., or other temperatures. For a Ge-on-Si detector, the absorption coefficient in the band of 1572-1626 nm increases as the temperature rises. Therefore, maintaining the temperature of PD above a certain temperature value, can make sure that the responsivity of PD is higher than a certain set value (or turning on the heating resistor can improve the responsivity to a certain extent).

Furthermore, for operating in other bands, such as 1524~1572 nm, it is possible to choose to turn on the heating resistor 11. For the Ge-on-Si detector, the absorption efficiency in the band of 1524~1572 nm increases at a slower rate with the temperature than that in the band of 1572~1626 nm, but there is also an increase to a certain degree. Therefore, turning on the heating resistor can improve the responsivity to a certain degree.

Figure 3:
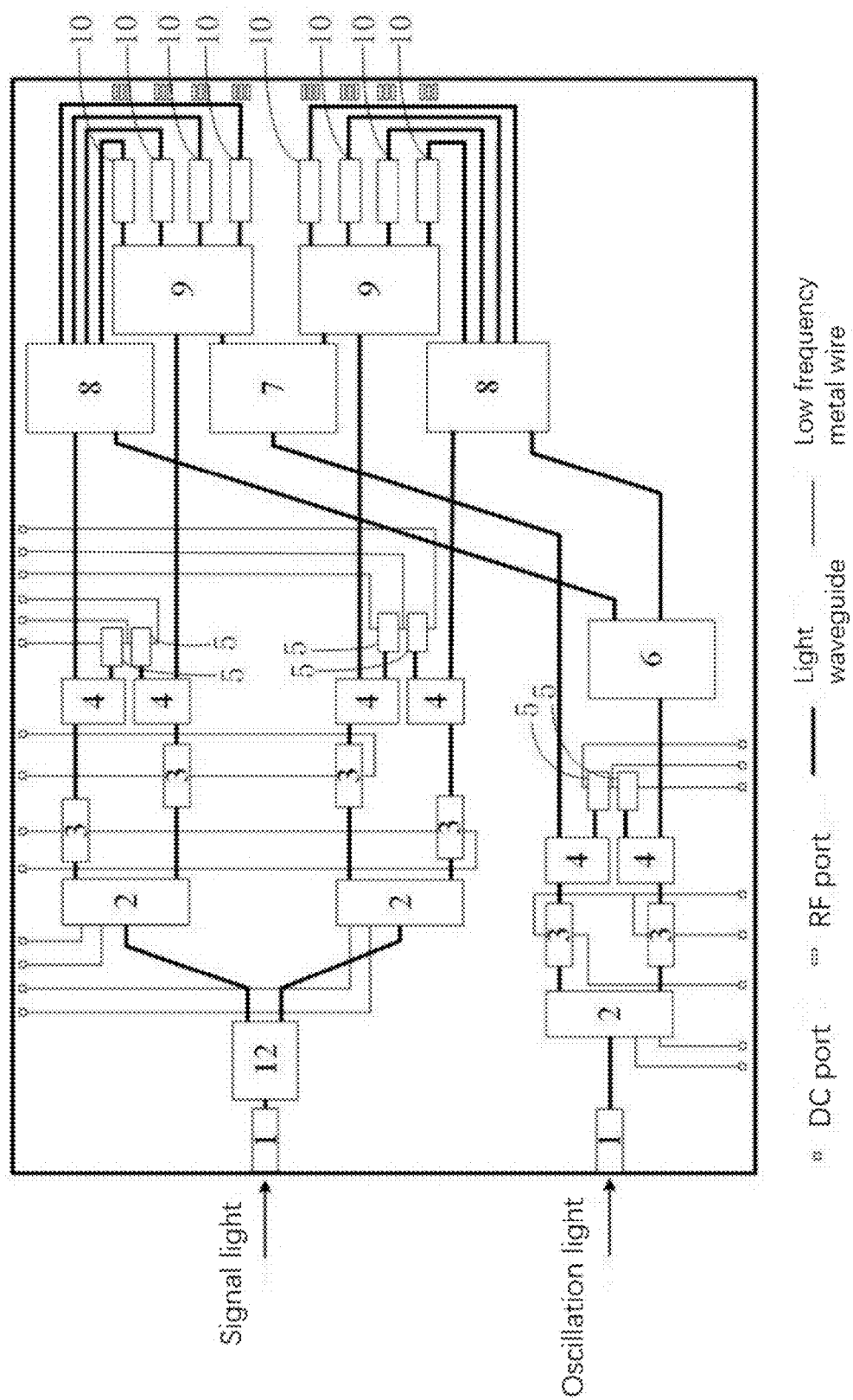
FIG. 3 is a schematically structural view of the coherent light receiving optical device without a heating resistor as shown in FIG. 1.

Please refer to FIG. 3, which shows a schematic view of a structure of the coherent light receiving optical device without the heating resistor according to an embodiment of the present invention.

As mentioned above, the heating resistor can not be provided near the high speed detector 10. Besides this, all the remaining components in FIG. 3 are set in the same way as in FIG. 1.

Figure 4:
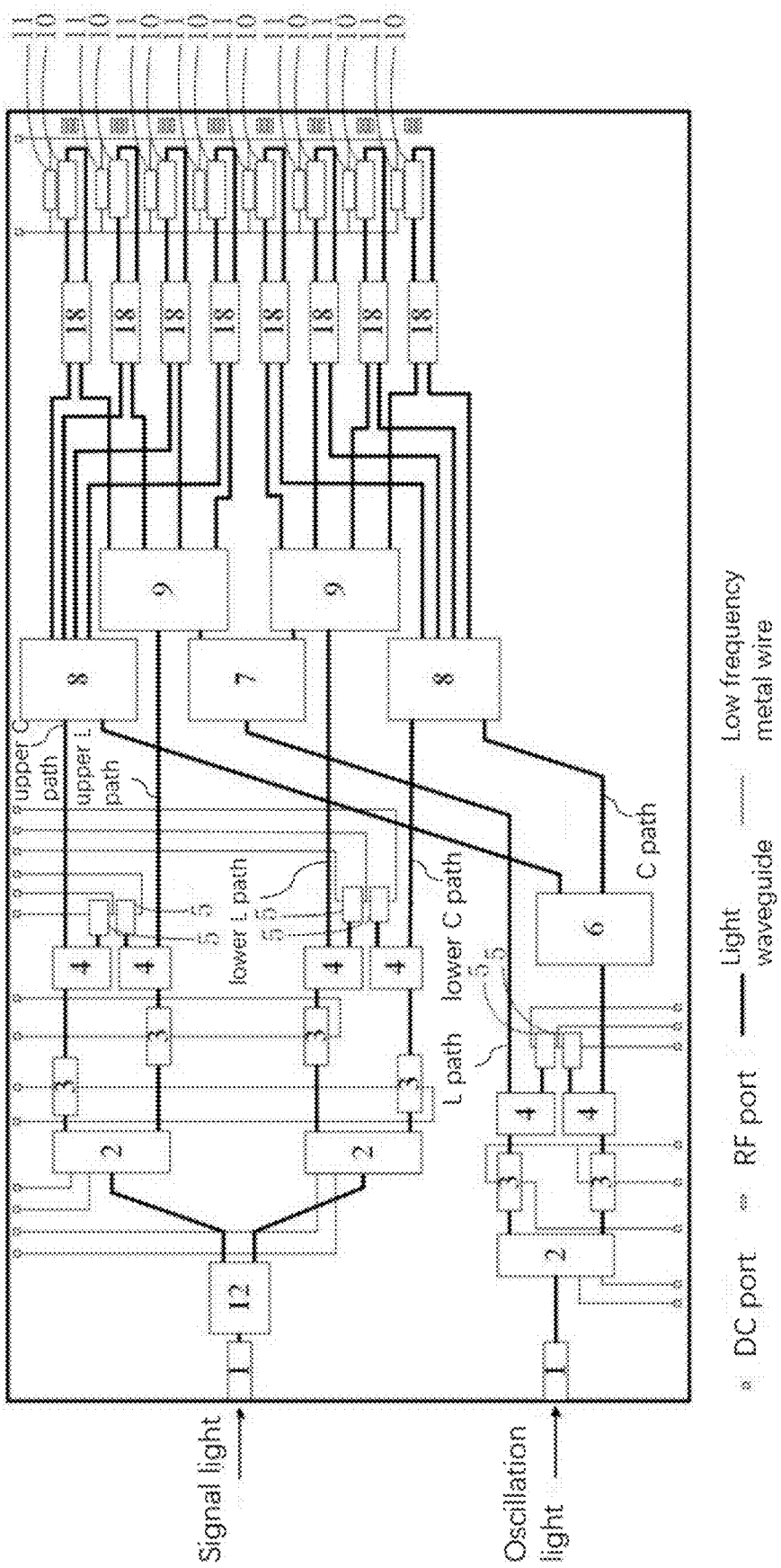
FIG. 4 is a schematically structural view of another variant of the coherent light receiving optical device including a 2×2 power beam splitter according to the present invention.

Please refer to FIG. 4, which shows a schematic view of a structure of the coherent light receiving optical device according to another variant of the present invention.

Specifically, the difference of FIG. 4 from the structure shown in FIG. 1 is that a 2×2 power beam splitter 18 is disposed in front of each high speed detector (or a photo-detector PD).

The operating bands of the 2×2 power beam splitter 18 are the C band+the L band. Within the operating band range, the split ratio of the 2×2 power beam splitter 18 can have a large variation range, for example, from 20:80 to 50:50. The 2×2 power beam splitter 18 is provided with two input ends, with one input end connected to the mixed light outputted from the first band optical hybrid 8 of the C path, and the other end connected to the mixed light outputted from the second band optical hybrid 9 of the L path; the 2×2 power beam splitter is provided with two output ends, both of which need to be connected to the same high speed detector PD simultaneously.

Taking operating on the C band an example, (1) the signal light passes through the edge coupler 1 in the signal path and enters the silicon photonic chip, and then passes through the polarization rotation beam splitter 12 and is split to two signal lights. The two signal lights respectively enter the corresponding optical switches 2. Taking one signal light of the C band (the upper C path as shown in FIG. 4) as an example, the light passes through the light switch 2 and is outputted from the C path. After passing through the adjustable optical attenuator 3 and the light splitter 4, it enters the C band 90° optical hybrid (i.e. the first band optical hybrid) 8; in the first band optical hybrid 8, is mixed with the C band oscillation light from the oscillation path and they enter the 2×2 power beam splitters respectively. After passing through the 2×2 power beam splitter, the split mixed lights enter the high speed detectors 10. Meanwhile, a small proportion of the signal light which is split by the light splitter 4 enters the power monitoring detector 5.

The other path of the signal light of the C band (i.e., the lower C path shown in FIG. 4) transmits in the same way as described above.

(2) After passing through the edge coupler 1, the oscillation light enters the silicon photonic chip, and then the optical switch 2. The oscillation light is outputted from the C path after passing through the optical switch 2; after passing through the adjustable optical attenuator 3, the light splitter 4 and the C band 1×2 power beam splitter 6, the oscillation lights respectively enter the two C band 90° optical hybrids (the first band optical hybrids) 8. In the first band optical hybrid 8, the oscillation light is mixed with the signal light from the signal path, and after respectively passing through the 2×2 power beam splitter, the split mixed lights enters the high speed detectors 10.

When the oscillation light is operating in the L band, the oscillation light is outputted from the L path by the optical switch 2, and the mode of light transmission thereof is identical with or corresponding to that of the oscillation light operating in the C path.

The operating bands, the implementation mode of the high speed detectors, the configuration and usage mode of the power monitoring detectors, as well as the method of equivalently enhancing the extinction ratio of the optical switch by using the adjustable optical attenuator, are identical with those described in conjunction with FIG. 1. Therefore, specific details thereof are not repeated herein.

Figure 5:
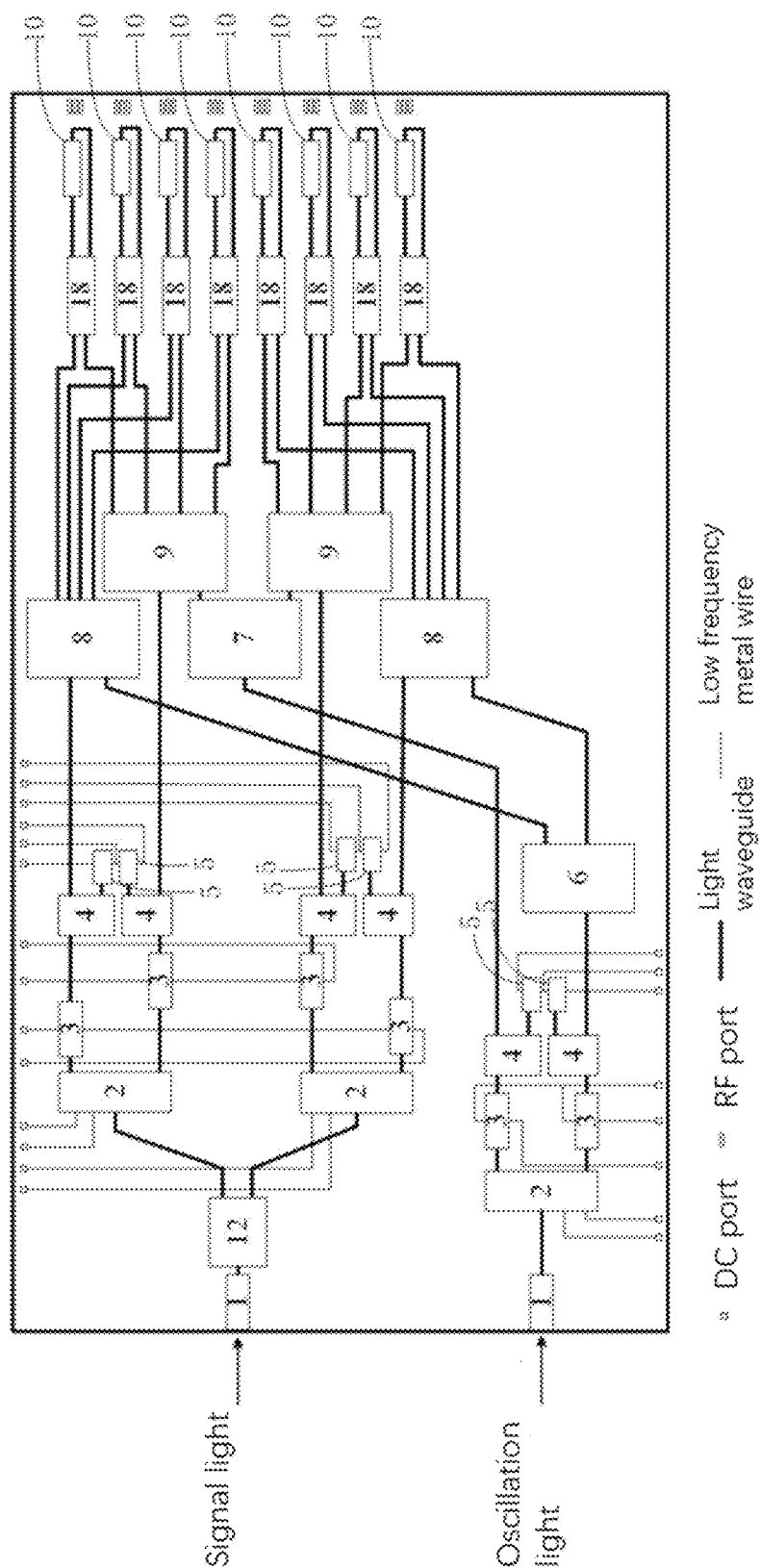
FIG. 5 shows a schematically structural view of the coherent light receiving optical device without a heating resistor as shown in FIG. 4.

Please refer to FIG. 5, similarly, the coherent light receiving optical device can be provided without the heating resistor, which is similar to the setting of the coherent light receiving optical device as shown in FIG. 4.

Figure 6:
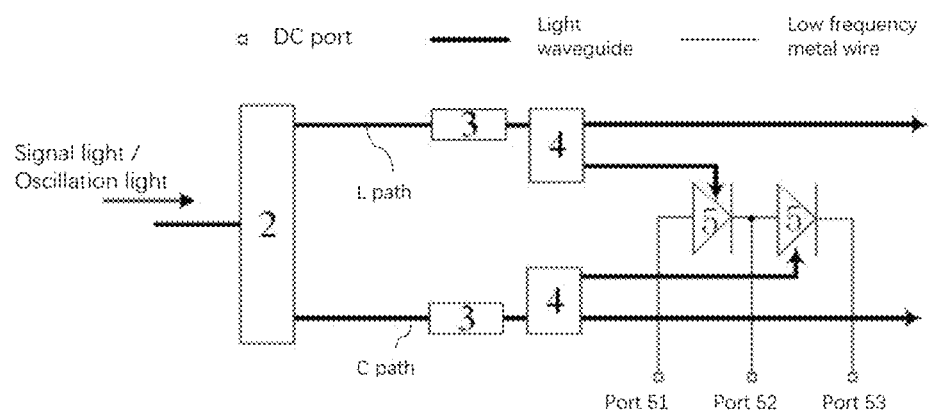
FIG. 6 is a schematic view of a first configuration for an optical switch, an adjustable optical attenuator, a light splitter, and a power monitoring detector according to an embodiment of the present invention.

Please refer to FIG. 6, which shows a schematic view of the first configuration of the optical switch 2, the adjustable optical attenuators (VOA) 3, the light splitter 4 and the power monitoring detector 5 according to one embodiment of the present invention.

As shown, the power monitoring detector 5 is comprised by two Ge-on-Si photodetectors (PD) in series. Herein, the power monitoring of the oscillation light after passing the optical switch 2 is taken as an example.

The first configuration of the optical switch 2, the adjustable optical attenuators (VOA) 3, the light splitters 4 and the power monitoring detector 5 is: the two power monitoring detectors (i.e., PD) 5 in series, a proportion of the light in the C path which is split by the light splitter 4 enters a PD at a right side thereof, and a proportion of the light in the L path which is split by the light splitter 4 enters a PD at a left side thereof.

A port 53 is connected to a positive voltage to provide bias, a port 52 is connected to a positive voltage to provide bias which is a half of the voltage value of the port 53, and a port 51 is connected to ground.

In an operating mode, the optical switch 2 will output all lights to the C path to monitor the photocurrent of the port 52. When the optical switch 2 is configured correctly, the photocurrent flows out from the port 52 with the maximum absolute value. The change of the environmental temperature can cause the absolute value of the photocurrent flowing out from the port 52 to decrease or even reverse. At this time, a feedback signal is provided to the optical switch 2 by combining the external circuit and the current change of the port 52, so that the optical switch 2 can return to the optimal operating point.

In another operating mode, the optical switch 2 will output all lights to the L path to monitor the photocurrent of the port 52. When the optical switch 2 is configured correctly, the photocurrent flows in from the port 52 with the maximum absolute value. The change of the environmental temperature can cause the absolute value of the photocurrent flowing in from the port 52 to decrease or even reverse. At this time, a feedback signal is provided to the optical switch 2 by combining the external circuit and the current change of the port 52, so that the optical switch 2 can return to the optimal operating point. Herein, the "flow in" means that the photocurrent flows in the silicon photonic chip from external, the "flow out" means the photocurrent flows out from the silicon photonic chip.

Figure 7:
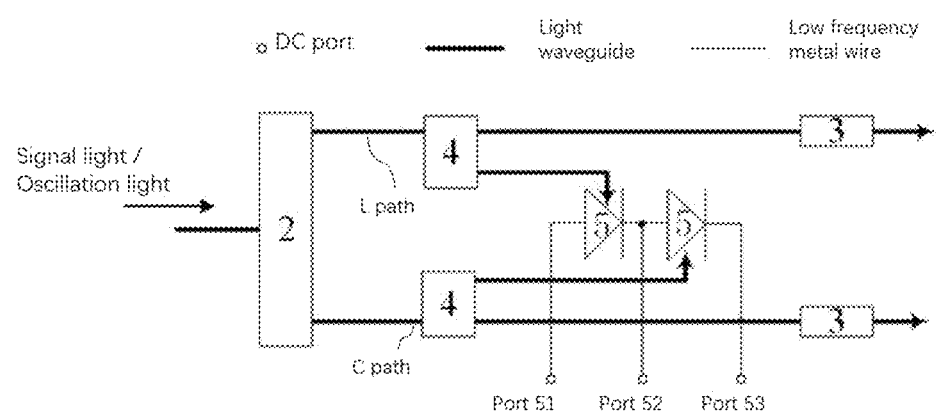
FIG. 7 is a schematic view of a second configuration for an optical switch, an adjustable optical attenuator, a light splitter, and a power monitoring detector according to an embodiment of the present invention.

Please refer to FIG. 7, which shows a schematic view of a second configuration of the optical switch 2, the adjustable optical attenuators (VOA) 3, the light splitters 4 and the power monitoring detectors 5 according to another embodiment of the present invention.

The difference of the configuration shown in FIG. 7 from FIG. 6 is that the adjustable optical attenuators 3 are disposed behind the power monitoring detectors 5, and the working mode thereof is identical with that of the first configuration as shown in the FIG. 6.

In the conventional coherent light receiving terminals, the signal path requires to be provided with the adjustable optical attenuator 3. It is required to turn on the adjustable optical attenuator 3 when the signal light is too strong; meanwhile, the adjustable optical attenuator 3 is not provided in the oscillation path. In the embodiment, the adjustable optical attenuators 3 are provided in both the signal path and the oscillation path. Generally, when the light is outputted via the optical switch 2 in the C path, outputting of the light in the L path cannot be completely eliminated, and vice versa. At this time, the adjustable optical attenuator 3 can be turned on, such as when it is required to output from the C path, the adjustable optical attenuator 3 in the L path can be turned on, so as to provide a range of attenuation from 0 to 30 dB, and vice versa. In this manner, the extinction ratio of the optical switch can be equivalently enhanced.

Figure 8:
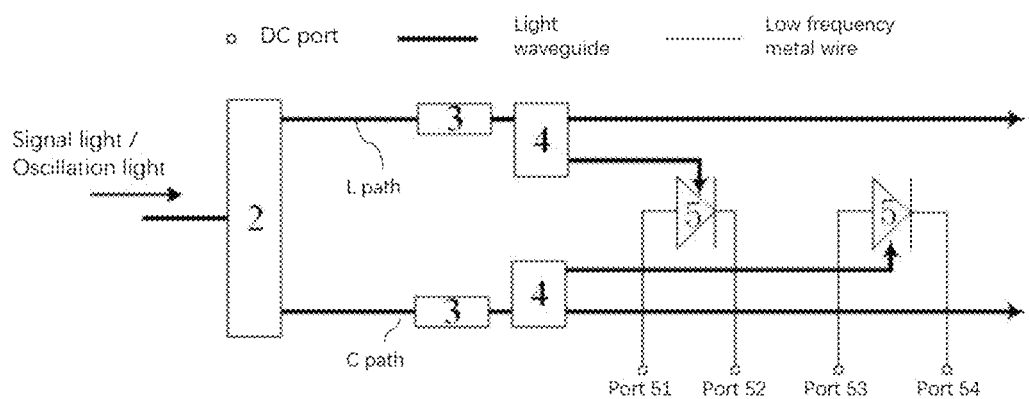
FIG. 8 is a schematic view of a third configuration for an optical switch, an adjustable optical attenuator, a light splitter, and a power monitoring detector according to an embodiment of the present invention.

Please refer to the FIG. 8, which shows a schematic view of a third configuration of the optical switch 2, the adjustable optical attenuators (VOA) 3, the light splitters 4 and the power monitoring detectors 5 according to another embodiment of the present invention.

The power monitoring detectors 5 are independent diode detectors, and both the C path and the L path are respectively provided with one power monitoring detector 5.

The positive bias is applied to the port 52 and the port 54 respectively, and the port 51 and port 53 are both connected to the ground. In this condition, the photocurrents of the port 52 and the port 54 can be monitored as the feedback signals for controlling the optical switch 2, or the photocurrents of the port 51 and the port 53 can be monitored as the feedback signals for controlling the optical switch 2.

When the output of the optical switch 2 is configured to be in the C path, the photocurrent is outputted from the port 53 or the port 54, and the photocurrent of the port 51 or the port 52 is much smaller than the photocurrent of the port 53 or the port 54. When the operating state of the optical switch 2 is changed due to the change of the environmental temperature, an absolute value of the photocurrent of the port 53 or the port 54 decreases, while the absolute value of the photocurrent of the port 51 or the port 52 increases. At this point, the operating point of the optical switch 2 can be adjusted accordingly to increase the absolute value of the photocurrent of the port 53 or the port 54 and decrease the absolute value of photocurrent of the port 51 or port 52 until the ratio thereof reaches the set value.

Figure 9:
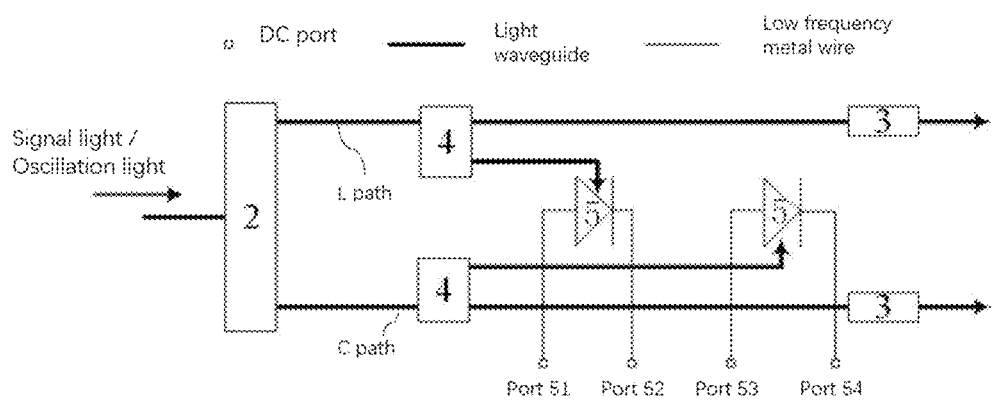
FIG. 9 is a schematic view of a fourth configuration for an optical switch, an adjustable optical attenuator, a light splitter, and a power monitoring detector according to an embodiment of the present invention.

Please refer to FIG. 9, which shows a schematic view of a fourth configuration of the optical switch 2, the adjustable optical attenuators (VOA) 3, the light splitters 4 and the power monitoring detectors 5 according to another embodiment of the present invention.

In the fourth configuration, the adjustable optical attenuators 3 are disposed behind the power monitoring detectors 5, and the working mode thereof is is identical with that of the configuration as shown in the FIG. 9.

Figure 10:
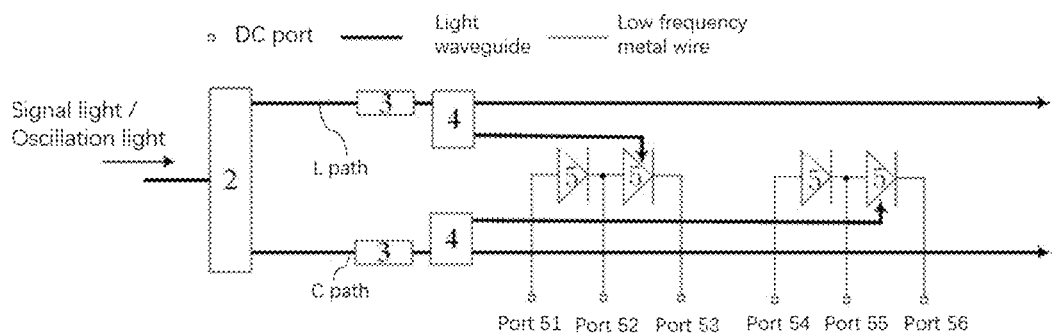
FIG. 10 is a schematic view of a fifth configuration for an optical switch, an adjustable optical attenuator, a light splitter, and a power monitoring detector according to an embodiment of the present invention.

Please refer to FIG. 10, which shows a schematic view of a fifth configuration of the optical switch 2, the adjustable optical attenuators (VOA) 3, the light splitters 4 and the power monitoring detectors 5 according to a further embodiment of the present invention.

In the fifth configuration, the power monitoring detectors 5 are connected in series, which is similar to the setting in the first configuration, but there are two groups of the power monitoring detectors 5 in series for each optical switch 2, the group of the power monitoring detectors 5 in series on the left side is connected with the light which is split from the light splitter 4 in the L path, and the other group of the power monitoring detectors 5 in series on the right side is connected with the light which is split from the light splitter 4 in the C path.

In operation, the positive biases are applied to the port 53 and the port 56, and the positive biases are connected to the port 52 and the port 55, the voltages thereof are a half of the voltages of the port 53 and the port 56. The port 51 and the port 54 are connected to the ground. The outputs of the photocurrents are monitored at the port 52 and port 55. In this condition, the photocurrents have only one direction, and the size of the absolute values of the photocurrents can be used as the feedback signal for controlling the optical switch 2.

When the output of the optical switch 2 is configured to be the C path, the photocurrent is outputted from the port 55, and the photocurrent of the port 53 is much smaller than that of the port 55. When the operating state of the optical switch is changed due to the change of the circumstance temperature, the absolute value of the photocurrent at the port 55 is reduced, and the absolute value of the photocurrent at the port 53 is increased. At the same time, the operating point of the optical switch 2 can be correspondingly adjusted to increase the absolute value of the photocurrent at the port 55 and decrease the absolute value of the photocurrent at the port 53 until the ratio thereof reaches the set value.

Figure 11:
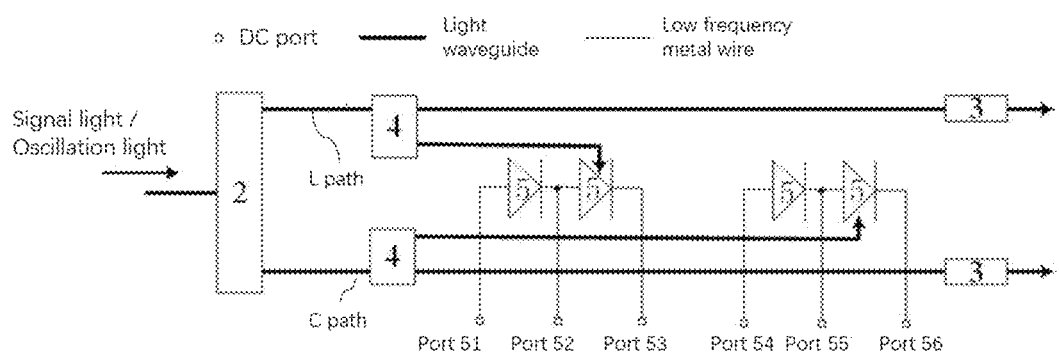
FIG. 11 is a schematic view of a sixth configuration for an optical switch, an adjustable optical attenuator, a light splitter, and a power monitoring detector according to an embodiment of the present invention.

Please refer to FIG. 11, which shows a schematic view of a sixth configuration of the optical switch 2, the adjustable optical attenuators (VOA) 3, the light splitters 4, and the power monitoring detectors 5 according to a further embodiment of the present invention.

In the sixth configuration, the adjustable optical attenuators 3 are disposed behind the power monitoring detectors, and the working mode thereof is identical with that of the fifth configuration as shown in FIG. 11.

In another variant, the setting of the coherent light receiving optical device is identical with that as shown in FIG. 1, and the difference therebetween lies in the setting or definition of the two different bands where it works.

Specifically, the operating band of the broad-spectrum devices are the C band and the L band. The operating band of the 1×2 power beam splitter 6 and the first band optical hybrid 8 is a front half part of the C band, the operating band of the 1×2 power beam splitter 7 and the second band optical hybrid 9 is a back half part of the C band; or, the operating band of the 1×2 power beam splitter 6 and the first band optical hybrid 8 is a front half part of the L band, the operating band of the 1×2 power beam splitter 7 and the second band optical hybrid 9 is a back half part of the L band.

In a practical example, the C band ranges from 1524 nm-1527 nm, the front half part of the C band ranges from 1524 nm-1548 nm, and the back half part of the C band ranges from 1548 nm-1572 nm.

In another practical example, the L band ranges from 1572 nm-1626 nm, the front half part of the L band ranges from 1572 nm-1599 nm, the back half part of the L band ranges from 1599 nm-1626 nm.

In this variant example, because the 1×2 power beam splitter 6 and the first band optical hybrid 8, the 1×2 power beam splitter 7 and the second band optical hybrid 9 all only need to work on the half of the band range which it should be originally worked on, and the key performance thereof can be improved better.

For the 1×2 power beam splitters 6 and 7, different parameter configurations are used in the fabrication of the silicon photonic chips, with the 1×2 power beam splitter 6 is optimized for an insertion loss in one half of the band and the 1×2 power beam splitter 7 is optimized for the insertion loss in the other half of the band. For the first band optical hybrid 8 and the second band optical hybrid 9, different parameter configurations are used in the fabrication of the silicon photonic chip, with the first band optical hybrid 8 is optimized for the insertion loss and a common mode rejection ratio in one half of the band, and the second band optical hybrid 9 is optimized for the insertion loss and the common mode rejection ratio in the other half of the band. During operation, when the signal wavelength is the front half of the band, the optical switch 2 selects one of the paths to output; when the signal wavelength is the back half of the band, the optical switch 2 selects the other one of the paths to output.

In this variant example, lower insertion loss for the 1×2 power beam splitter and the 90° optical hybrid is achieved, and higher common mode rejection ratio for the 90° optical hybrid is achieved.

For the coherent light receiving optical device or the silicon photonic chip provided by the present invention, all the devices of the silicon photonic chip are achieved by a silicon waveguide, a silicon passive device and the Ge-on-Si detector. Further, except the Ge-on-Si detector, the remaining devices of the silicon photonic chip can be achieved by the SiN waveguide and SiN passive device which includes the edge coupler 1, the optical switch 2, the adjustable optical attenuator 3, the light splitter 4, the power monitoring detector 5, the high speed detector 10, the heating resistor 11, the 1×2 power beam splitters 6 and 7, and the 90° optical hybrids 8 and 9. The SiN waveguides and devices are monolithic integration with the silicon substrate and detectors, which should also be considered as a type of silicon photonic chip.

Figure 12:
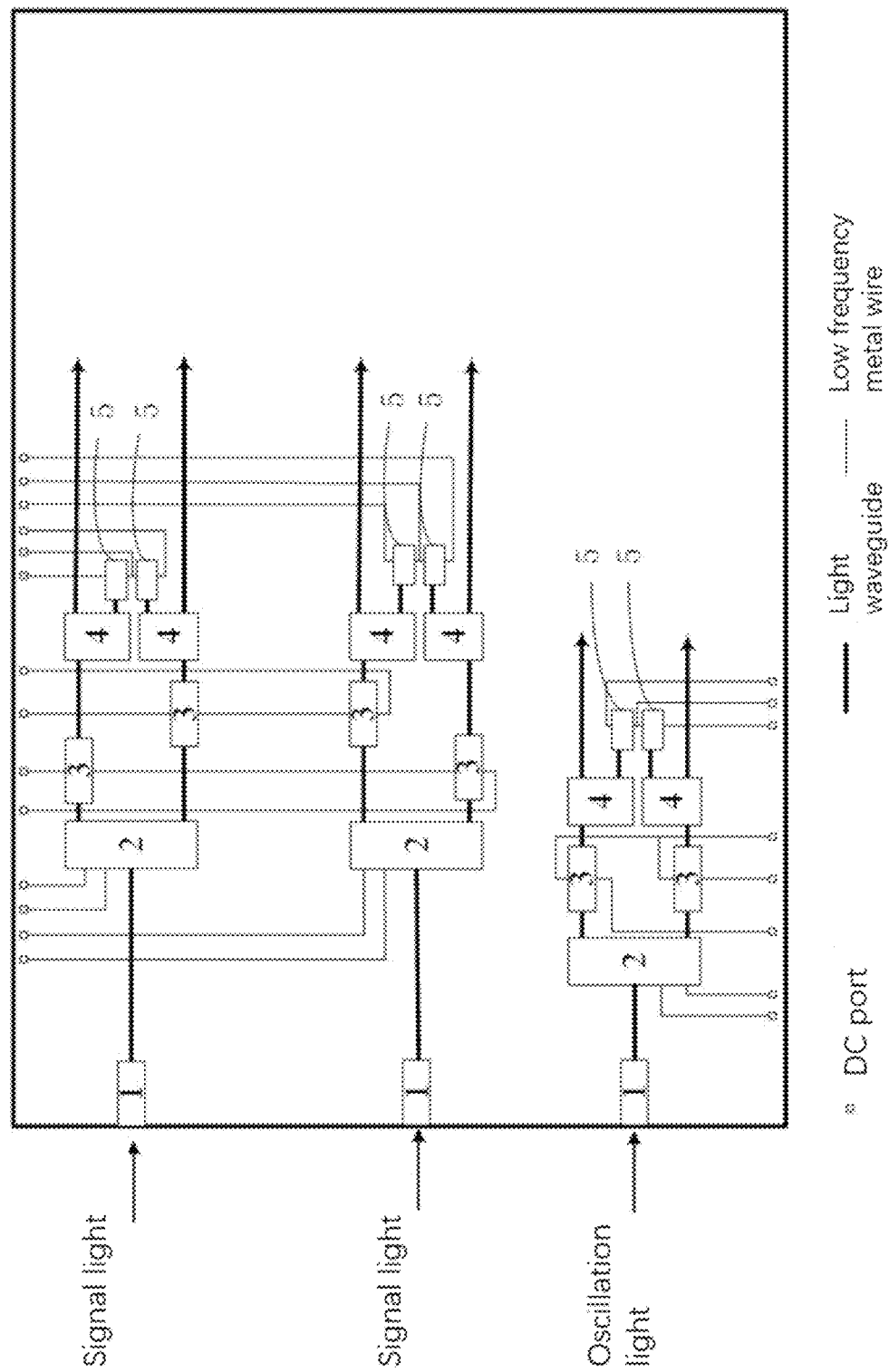
FIG. 12 is a schematic view of another variant of the coherent light receiving optical device according to another embodiment of the present invention.

Please refer to FIG. 12, which shows a schematic view of another variant of the coherent light receiving optical device according to a yet further embodiment of the present invention.

Based on the setting of the silicon photonic chip mentioned above, the following variations or modifications can also be made.

The polarization rotation beam splitter can not be provided on the silicon photonic chip. Instead, an externally provided polarization beam splitter or a combination of the polarization beam splitter and the polarization rotator can be used to separate the two polarization states of the signal light and then couple them into the silicon photonic chip respectively.

At this point, the configuration of the front half of the silicon photonic chip, i.e., in front of the optical hybrids 8 and 9, and the 1×2 power beam splitters 6 and 7, is shown in FIG. 12. The optical connections behind the optical hybrids 8 and 9, and the 1×2 power beam splitters 6 and 7 are the same as those shown in FIG. 1-5.

Figure 13:
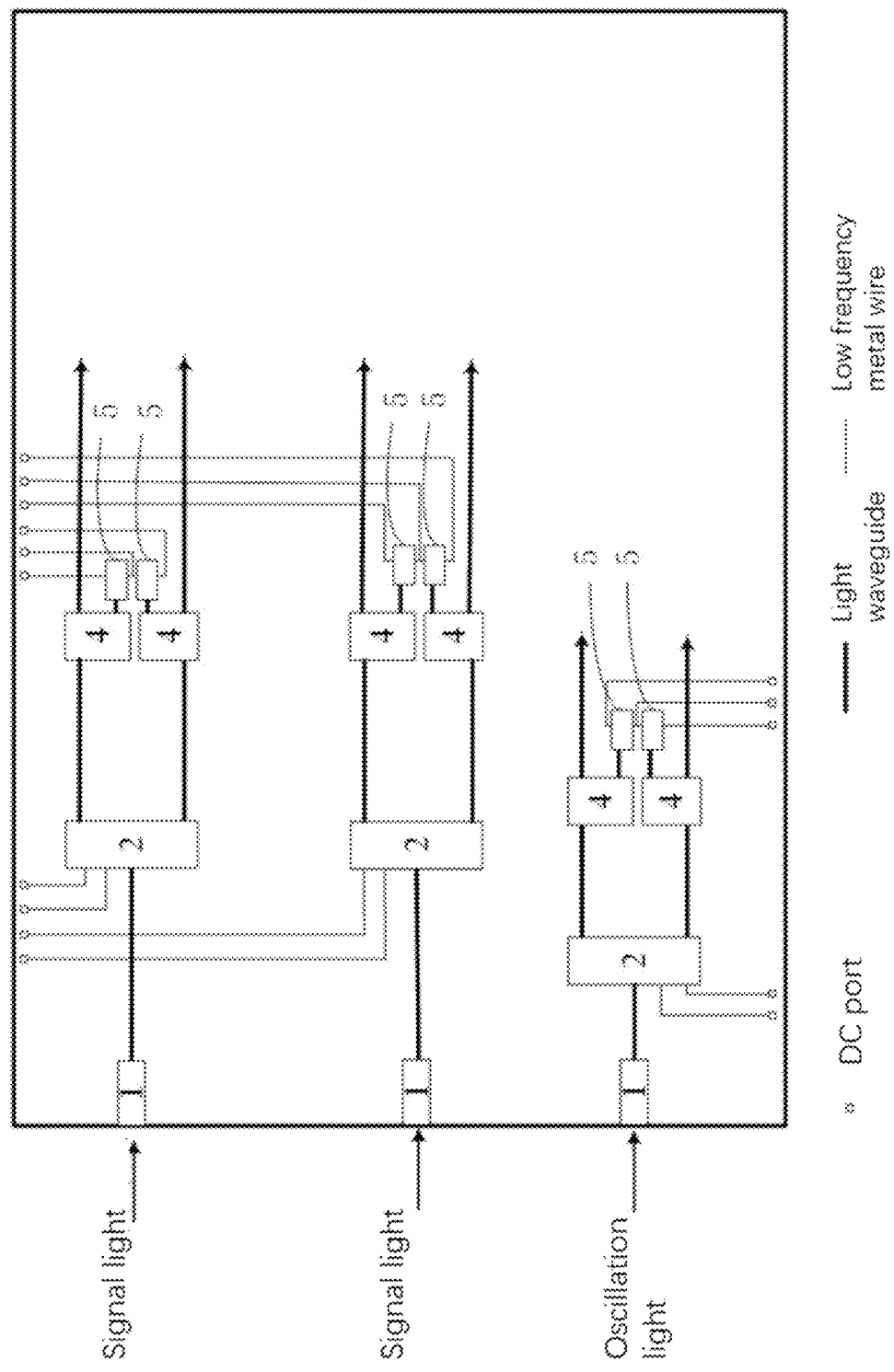
FIG. 13 is a schematic view of a further variant of the coherent light receiving optical device according to a further another embodiment of the present invention.

Please refer to FIG. 13, which shows a schematic view of another variant of the coherent light receiving optical device according to a still yet further embodiment of the present invention.

Based on the setting of the silicon photonic chip mentioned above, the following variations or modifications can also be made.

The polarization rotation beam splitter and the adjustable optical attenuator can not be provided on the silicon photonic chip. Instead, an externally provided adjustable optical attenuator, the externally provided polarization beam splitter or a combination of a polarization beam splitter and a polarization rotator can be used to separate the two polarization states of the signal light and couple them into the silicon photonic chip. When the externally provided adjustable optical attenuator, the light splitter can also be provided adjacent to the adjustable optical attenuator and located upstream or downstream of the adjustable optical attenuator.

At this point, the configuration of the front half of the silicon photonic chip, i.e., the configuration in front of the optical hybrids 8 and 9, and the 1×2 power beam splitters 6 and 7, is shown in FIG. 13. The optical connections behind the optical hybrids 8 and 9, and the 1×2 power beam splitters 6 and 7 are the same as those described in FIG. 1-5. In this configuration, the adjustable optical attenuator no longer has the function of increasing the extinction ratio of the optical switch.

Figure 14:
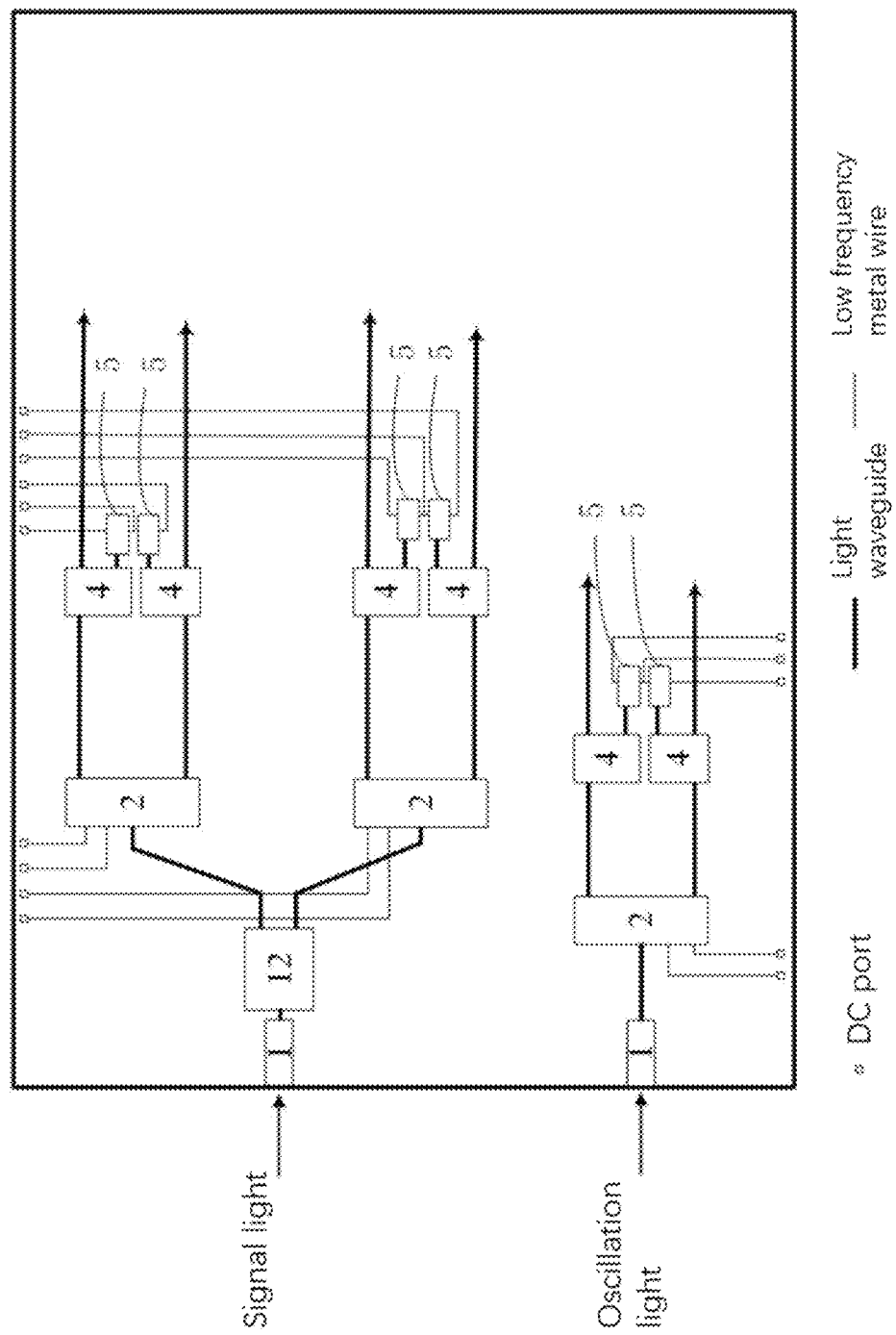
FIG. 14 is a schematic view of a variant of the coherent light receiving optical device according to a yet further embodiment of the present invention.

Please refer to FIG. 14, which is a schematic view of another variant of the coherent light receiving optical device according to a further another embodiment of the present invention.

Based on the setting of the silicon photonic chip mentioned above, the following variations or modifications can also be made.

The adjustable optical attenuator can not be provided on the silicon photonic chip, whereas an adjustable optical attenuator is externally provided. At this point, the configuration of the front half of the silicon photonic chip, i.e., the configuration in front of the optical hybrids 8 and 9, and the 1×2 power beam splitters 6 and 7, is shown in FIG. 14. The optical connections behind the optical hybrids 8 and 9, and the 1×2 power beam splitters 6 and 7 are the same as those described in FIG. 1-5. In this configuration, the adjustable optical attenuator no longer has the function of increasing the extinction ratio of the optical switch.

In various embodiments of the present invention, the coupler 1 can be an edge coupler, a grating coupler, or a light waveguide. In some configurations, the signal path may use a dual-polarization grating coupler while having the function of polarization rotation and splitting. At this time, the polarization rotating beam splitter can be removed from the signal path, and there is no need to dispose it outside the silicon photonic chip.

In various embodiments of the present invention, discrete optical devices may be used for the configuration.

In various embodiments of the present invention, the two different bands can be exchanged with each other without affecting the normal operation of the chip.

In various embodiments of the present invention, the C band and L band can refer to some specific bands, such as the C band from 1524 nm to 1572 nm, and the L band from 1572 nm to 1626 nm; or they can be any two arbitrarily defined bands.

Alternatively, in various embodiments of the present invention, for coherent receiving in different bands, multiple groups of devices can be configured on the same chip, wherein no other devices besides the coupler are multiplexed in different bands, or the key high speed detectors are not multiplexed but with one group of high speed detectors for each band.

Alternatively, in various embodiments of the present invention, a narrow-spectrum device is optimized and designed to become the broad-spectrum device, eliminating the need for the optical switch to switch between the different paths. One approach employs a design of special elements and devices so that the 1×2 power beam splitters and the 2×2 power beam splitters can become the broad-spectrum devices that are passive devices and do not require external control.

Furthermore, by using these broad-spectrum 1×2 power beam splitters and 2×2 power beam splitters to build the 90° optical hybrid, the 90° optical hybrid also becomes the broad-spectrum device. Another approach involves a special design of elements and devices to make the 1×2 power beam splitters and 2×2 power beam splitters to be the broad-spectrum devices, but it is necessary for the external control.

According to the detailed description above, it can be seen that in the various embodiments of the present invention, the silicon photonic chip includes all the devices required for the complete receiving optical front terminal, including the coupler, the polarization beam splitting rotator, the 1×2 power beam splitters, the adjustable optical attenuators, the power monitoring detectors, the light splitters (tap), the 90° optical hybrids, the high speed detectors, etc. Additionally, the optical switch is added for switching the light paths between different bands. However, the polarization beam splitting rotator, the coupler, and the adjustable optical attenuators are not necessary herein.

In the present invention, the silicon photonic chip or the coherent light receiving optical device is typically configured to support two bands, each optical switch can at least switch between the two paths, and each high speed detector has at least two input ports or can couple the light from the two paths into the same detector simultaneously.

In some embodiments, for a complete dual-polarization coherent receiver terminal, 8 high speed detectors are required to form a complete dual-polarization-IQ signal receiving terminal. The coherent light receiving optical device of the present invention covers two communication bands, and all bands multiplex this group of high speed detectors. Therefore, when the silicon photonic chip is packaged with a high speed transimpedance amplifier (TIA) photonic chip, only one high speed TIA is needed, and only one high speed DSP is needed subsequently. This greatly reduces the complexity and cost of RF packaging.

The present invention provides six configuration schemes of the optical switches, the power monitoring detectors, and the adjustable optical attenuators, which are all compatible with the overall design scheme of the coherent light receiving optical device.

In some embodiments, the adjustable optical attenuators can be used to further enhance the extinction ratio of the optical switch.

In some embodiments, the coherent light receiving optical device can also operate in one band, and divide the one band into the front half band and the back half band. A first type of optical hybrid or 1×2 power beam splitter is designed for the front half band, and a second type of optical hybrid or 1×2 power beam splitter is designed for the back half band. Since each optical hybrid or power beam splitter only needs to operate within the half of the band, the common mode rejection ratio of the optical hybrid can be greatly improved, and the insertion loss of the optical hybrid or power beam splitter can also be reduced.

In some embodiments, the coherent light receiving optical device can be achieved by the silicon photonic chip. In one approach, the waveguide is a silicon waveguide, the passive devices are silicon passive devices, and the detectors are the Ge-on-Si detectors. In another approach, the waveguide is a SiN waveguide, the passive devices are SiN passive devices, and the detectors are the Ge-on-Si detectors.

Alternatively, the coherent light receiving optical device can also be implemented by InP-based or silicon dioxide waveguide chips or the like, or constructed by discrete optical elements and devices.

The coherent light receiving optical device in accordance with the embodiments of the present invention have at least one or a portion of the following advantages:

Various embodiments of the present invention provide the coherent light receiving optical device or the coherent light receiving chip for multi-bands, wherein the broad-spectrum optoelectronic devices are multiplexed for the different working bands; for the devices that cannot work in the broad spectrum, the independent devices are disposed for each band, and all devices are integrated in the single chip to achieve the function of covering bands on the single chip. Furthermore, by multiplexing a portion of high speed optoelectronic devices, the demand for the high speed electronic chips to be used is reduced, thereby reducing the final cost of use.

While some embodiments of the generally inventive concept of the present invention have been shown and described, those skilled in the art will understand that changes may be made to these embodiments without departing from the principles and spirit of the generally inventive concept of the present invention. The scope of the present invention should be defined by the claims and their equivalents.

What is as claimed is:

1. A coherent light receiving optical device, wherein the coherent light receiving optical device comprises:
    an optical switch group in a signal path, the optical switch group comprises three optical switches, wherein a first signal light is outputted as a first band signal light and a second band signal light of the first signal light after passing through a first optical switch of the three optical switches, a second signal light is outputted as a first band signal light and a second band signal light of the second signal light after passing through a second optical switch of the three optical switches; and a third optical switch of the three optical switches is configured to output as a first band oscillation light and a second band oscillation light after an oscillation light passes through it;
    a 1×2 power beam splitter group in an oscillation path, the 1×2 power beam splitter group comprises two 1×2 power beam splitters, one of which splits the first band oscillation light outputted by the third optical switch into two first band split oscillation lights and the other of which splits the second band oscillation light outputted by the third optical switch into two second band split oscillation lights;
    an optical hybrid group, the optical hybrid group comprises two first band optical hybrids and two second band optical hybrids, wherein each of the two first band optical hybrids is configured to mix each of the said two first band split oscillation lights from the oscillation path with a corresponding one of said first band signal lights of the first signal light and said first band signal light of the second signal light from the signal path and then output a first band mixed light, and each of the two second band optical hybrids is configured to mix each of the two second band split oscillation lights from the oscillation path with a corresponding one of said second band signal lights of the first signal light and said second band signal light of the second signal light from the signal path and then output a second band mixed light;
    a detector group, each detector of the detector group is used to convert the first band mixed light and the second band mixed light into the photocurrent in the same detector so as to multiplex the detector.

2. The coherent light receiving optical device as claimed in claim 1, characterized in that,
    the coherent light receiving optical device further comprises a polarization rotation beam splitter which is disposed upstream of the optical switch of the three optical switches which are arranged in the signal path, the polarization rotation beam splitter is configured to split one of the two signal lights into a first polarization rotation signal light and a second polarization rotation signal light and they enter the optical switch; or
    a polarization rotation beam splitter or a combination of a polarization beam splitter and a polarization rotator is disposed outside the coherent light receiving optical device, which is configured to split one of the two signal lights into a first polarization rotation signal light and a second polarization rotation signal light, and they respectively enter the optical switches of the coherent light receiving optical device which are arranged in the signal path.

3. The coherent light receiving optical device as claimed in claim 2, characterized in that, the coherent light receiving optical device further comprises at least one adjustable optical attenuator, which is disposed in an light path comprising the optical switch and is located behind the optical switch; or the coherent optical receiving optical device further comprises at least one adjustable optical attenuator disposed outside the coherent light receiving optical device, wherein at least one of the first signal light, the second signal light and the oscillation light passes through the at least one adjustable optical attenuator and enters the coherent light receiving optical device.

4. The coherent light receiving optical device as claimed in claim 3, characterized in that, the coherent light receiving optical device further comprises at least one light splitter, which is disposed adjacent to the at least one adjustable optical attenuator in the corresponding light path and located upstream or downstream of the at least one adjustable optical attenuator.

5. The coherent light receiving optical device as claimed in claim 4, characterized in that, the coherent light receiving optical device further comprises at least one power monitoring detector which is disposed downstream of each light splitter of the at least one light splitter in the light path, and a portion of the split light by the corresponding light splitter enters one of the at least one power monitoring detector or into at least two of the at least one power monitoring detector which are connected in series.

6. The coherent light receiving optical device as claimed in claim 1, characterized in that, the coherent light receiving optical device further comprises one heating resistor which makes temperature of each detector maintain above a predetermined temperature.

7. The coherent light receiving optical device as claimed in claim 1, characterized in that, the detector group comprises 8 high speed detectors;

the optical hybrid group comprises at least two 90° optical hybrid.

8. The coherent light receiving optical device as claimed in claim 1, characterized in that, the coherent optical receiving optical device further comprises at least one coupler, wherein at least one of the first signal light, the second signal light and the oscillation light enters the corresponding one of the signal path and the oscillation path after passing through the at least one coupler.

9. The coherent light receiving optical device as claimed in claim 1, characterized in that, the coherent light receiving optical device further comprises at least one 2×2 power beam splitter, wherein the at least one 2×2 power beam splitter is arranged behind the optical hybrid group;

the 2×2 power beam splitter is provided with two input ends, with one input end connected to the first band mixed light outputted from the first band optical hybrid of the signal path, and the other input end connected to the second band mixed light outputted from the second band optical hybrid of the oscillation path;

the 2×2 power beam splitter is provided with two output ends, both of which are connected to the same detector simultaneously.

* * * * *